United States Patent [19]
Saito

[11] Patent Number: 5,402,404
[45] Date of Patent: Mar. 28, 1995

[54] OPTICAL DISC APPARATUS HAVING AUTOMATIC GAIN CONTROL CIRCUIT OF OPEN LOOP TYPE

[75] Inventor: Yutaka Saito, Kawaguchi, Japan

[73] Assignee: Kabushiki Kaisha Toshiba, Kanagawa, Japan

[21] Appl. No.: 37,826

[22] Filed: Mar. 24, 1993

[30] Foreign Application Priority Data

Mar. 25, 1992 [JP] Japan .................................. 4-066484

[51] Int. Cl.[6] .............................................. G11B 7/09
[52] U.S. Cl. ............................. 369/44.35; 369/44.25; 369/44.29; 369/44.41
[58] Field of Search ............... 369/44.35, 44.41, 44.42, 369/44.36, 44.25, 44.29, 54

[56] References Cited

U.S. PATENT DOCUMENTS 5,107,389 4/1992 Botti et al. ........................ 361/103

5,162,678 11/1992 Yamasaki ........................ 307/491

FOREIGN PATENT DOCUMENTS 62-159351 7/1987 Japan ................................ 369/44.41
62-277636 12/1987 Japan ................................ 369/44.41

*Primary Examiner*—Aristotelis Psitos
*Assistant Examiner*—Muhammad N. Edun
*Attorney, Agent, or Firm*—Finnegan, Henderson, Farabow, Garrett & Dunner

[57] ABSTRACT

An optical disc apparatus generates a tracking error signal and a focusing error signal for an objective lens. In addition, the apparatus generates a tracking sum signal or a focusing sum signal for the objective lens. The apparatus multiplies the sum signal by the tracking error signal and the sum signal by the forcing error signal. Corresponding to the results of multiplications, the apparatus moves the objective lens in the tracking direction and focusing direction.

10 Claims, 5 Drawing Sheets

OPTICAL DISC APPARATUS HAVING AUTOMATIC GAIN CONTROL CIRCUIT OF OPEN LOOP TYPE

BACKGROUND OF THE INVENTION

1. Field of the Invention

The present invention generally relates to the filed of an optical disc apparatus and more particularly is directed to an optical disc apparatus for recording data on or reproducing data from an optical disc.

2. Description of the Related Art

Optical disc apparatus require several control circuits in order to precisely record or reproduce data. One of these circuits is a focusing control circuit or a tracking control circuit.

The focusing and tracking control is to direct a focusing error and a tracking error caused by the surface deflection or up-down movement of the disc surface while the optical disc is rotating, and move an optical system such as an objective lens in parallel with and in perpendicular to the optical axis of the laser beam according to the focusing error signal corresponding to the amount of detected focusing error and the tracking error signal corresponding to detected tracking error so as to keep the distance between an optical disc and an objective lens constant and to track a guide groove formed on the optical disc.

In general, the focusing control circuit and the tracking control circuit have an automatic going control circuit.

The automatic control circuit comprises a divider, having an arithmetic amplifier and a multiplier such as a transconductance multiplier connected to a feed back loop portion of the arithmetic amplifier, for keeping an amplitude of the focusing error signal or tracking error signal within a desired range in accordance with a loop gain of the divider. In the case, the loop gain of the divider is changed by controlling the conductance of the multiplier according to the focusing error signal or tracking error signal so as to precisely keeping the amplitude of the focusing error signal or tracking error signal within a desired range.

However, an offset of the automatic control circuit becomes large level in proportional to the loop gain change.

In addition, the amplitude of the focusing error signal obtained by the focusing control circuit and the amplitude of the tracking error signal obtained by the tracking control circuit should be suppressed to predetermined levels so as to remove such control errors.

However, generally, in optical disc apparatus, various types of optical discs produced by different manufacturers are used. The intensity of reflected light of optical discs may differ in the types thereof. The amplitude of the focusing error signal obtained by the focusing control signal and the amplitude of the tracking error signal obtained by the focusing control circuit depend on the intensity of the reflected light.

Thus, in the focusing control circuit and the tracking control circuit, the amplitude factors of the focusing error signal and the tracking error signal should be changed corresponding to the type of an optical disc for use.

A conventional automatic gain control circuit for changing the amplification factors of the focusing error signal and the tracking error signal is as follows;

An input terminal and one input terminal (first input terminal) of an operational amplifier are connected through a first register R. The other input terminal (second input terminal) of the operational amplifier is grounded. The output terminal of the operational amplifier is connected to an output terminal. The output terminal of the operational amplifier and the first input terminal of the operational amplifier are connected through a multiplier and a second resistor Rs. The coefficient of the multiplier is set corresponding to a control signal which is outputted from a control signal input terminal. By changing the coefficient, gain control is performed. In other words, the amplification factors of the focusing error signal and the tracking error signal are changed.

However, the amplification factor of the automatic gain control circuit is roughly given by the following formula.

$$AG = G(Rs + 1/gm)/R$$

where AG is the amplification factor of the automatic gain control circuit; G is a coefficient determined by both the amplification factor of the coefficient of the multiplier; and gm is a conductance of a multiplier. The amplification factor AG is proportional to the offset value of this circuit.

However, the value of $1/gm$ varies with a change of the temperature. Thus, the offset value of this circuit drifts in proportional to a change of the temperature. Thus, circuit offset of the focusing error signal and the tracking error signal increases. Thus, control errors of the focusing control and the tracking control result in.

SUMMARY OF THE INVENTION

The present invention is mode from the above-mentioned point of view.

A first object of the present invention is to provide an optical disc apparatus having a focusing control circuit and a tracking control circuit whose offset values are not affected by temperature.

A second object of the present invention is to provide an optical disc apparatus having a focusing control circuit and a tracking control circuit with simpler construction than with conventional apparatus.

To accomplish such objects, the present invention is an optical disc apparatus for radiating light to an optical disc through an objective lens and for recording and reproducing information, said apparatus comprising an error signal generation means for generating a tracking error signal of said objective lens, an identification means for identifying the type of said optical disc, an amplification means for amplifying said tracking error signal generated by said error signal generation means corresponding to the type of said optical disc identified by said identification means, and a drive means for moving said objective lens corresponding to the tracking error signal amplified by said amplification means.

According to the present invention, since the automatic gain control circuit is of an open loop type, an offset drift due to a temperature change less occurs in comparison with a conventional closed loop type automatic gain control circuit.

These and other objects, features and advantages of the present invention will become more apparent in light of the following detailed description of a best mode embodiment thereof, as illustrated in the accompanying drawings.

DETAILED DESCRIPTION OF PREFERRED EMBODIMENTS

Figure 1:
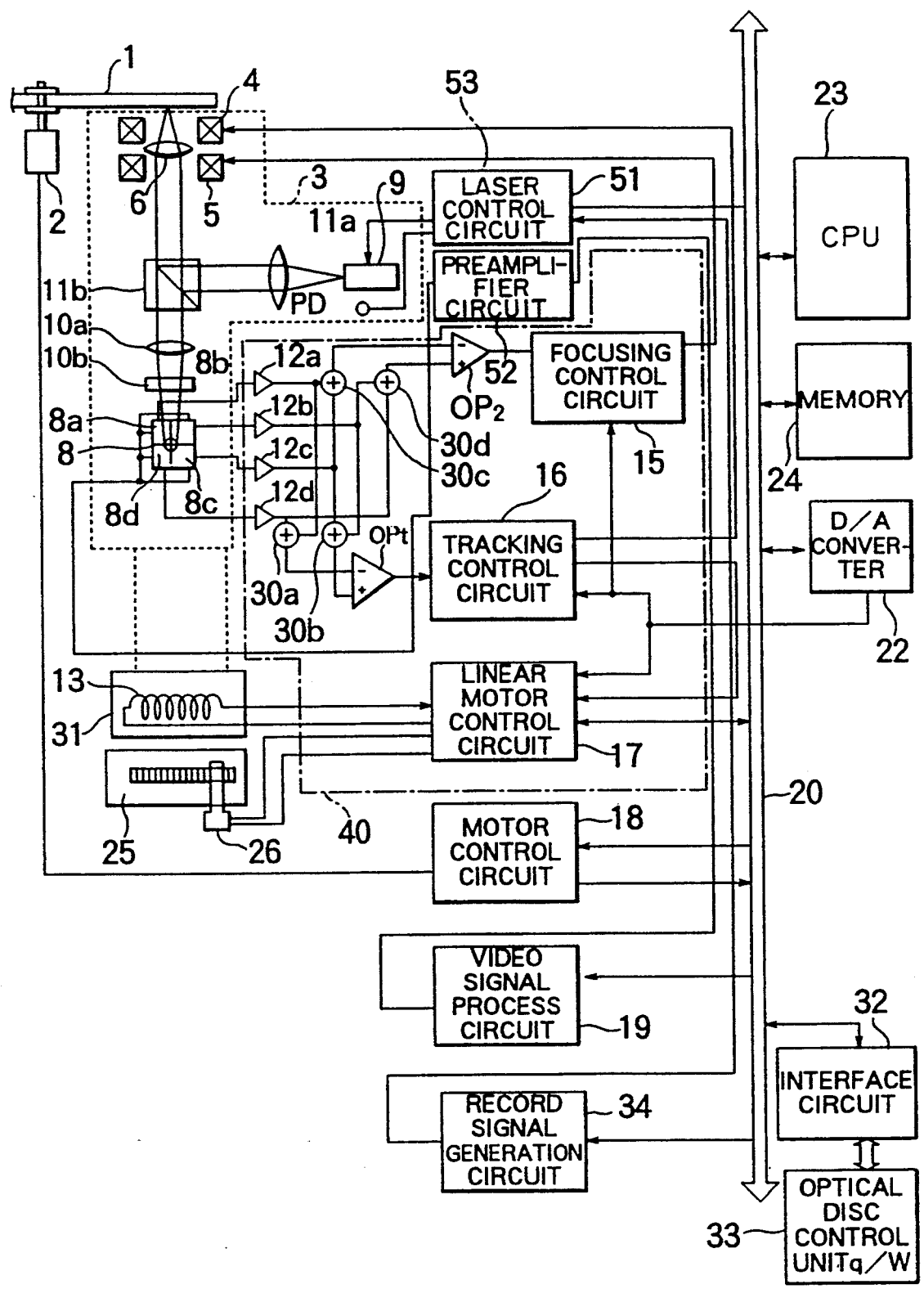
FIG. 1 is a schematic block diagram of the optical disc apparatus of the present invention.

With reference to the accompanying drawings, wherein the same reference numerals designate same or corresponding elements throughout the several views, FIG. 1 illustrates an optical recording and reproducing apparatus. More particularly, FIG. 1 illustrates an optical recording and reproducing apparatus in the form of an optical disc apparatus.

This optical disc apparatus is used for recording data on, reproducing data from, and erasing data recorded on an optical memory such as an optical disc 1 by radiating a focused beam on the optical disc 1.

The optical disc 1 has grooves (not shown).

The grooves (tracks) are spirally or concentrically formed on a surface of the optical disc 1. The optical disc 1 is rotated by a motor 2 at a constant speed (e.g., 1,800 rpm). The motor 2 is controlled by a motor control circuit 18.

Although the optical disc 1 has a recording film in which pits are formed, the recording film based on a phase change or a multilayered recording film may be used.

An optical head 3 is arranged near the lower surface of the optical disk 1. Data is recorded/reproduced on/from the optical disc 1 by the optical head 3.

The optical head 3 is fixed to a driving coil 13 as the movable portion of a linear motor 31. A driving coil 13 is connected to a linear motor control circuit 17. A linear motor position detector 26 is connected to a linear motor control circuit 17. Upon detection of an optical scale 25 formed on the optical head 3, the linear motor position detector 26 outputs a position signal.

A permanent magnet (not shown) is arranged on the stationary portion of the linear motor 31. When the driving coil 13 is excited by the linear motor control circuit 17 to drive the linear motor 31, a laser beam emitted from the optical head 3 is moved in the radial direction of the optical disk 1.

As shown in FIG. 1, the optical head 3 comprises an objective lens 6, driving coils 4 and 5 for driving the objective lens 6, a photodetector 8, a laser diode 9 as a semiconductor laser oscillator, a condenser lens 10a, a cylindrical lens 10b, a collimator lens 11a for collimating a laser beam from the laser diode 9, a half prism 11b, and a photodiode PD as a light-receiving element for outputting a current corresponding to the amount of light emitted from the laser diode 9.

The objective lens 6 is suspended from a stationary portion (not shown) through a wire suspension, as shown in FIG. 1. The objective lens 6 is moved by the driving coil 5 in the focusing direction, i.e., the direction of the optical axis of the objective lens 6, and is moved by the driving coil 4 in the tracking direction, i.e., a direction perpendicular to the optical axis of the objective lens 6.

A laser beam emitted from the laser diode 9 driven by a laser control circuit 51 is radiated onto the optical disc 1 through the collimator lens 11a, the half prism 11b, and the objective lens 6. Light reflected by the optical disc 1 is guided to the photodetector 8 through the objective lens 6, the half prism 11b, the condenser lens 10a, and the cylindrical lens 10b.

The monitor photodiode PD is arranged near the laser diode 9. The photodiode PD outputs a current corresponding to the amount of a light beam emitted from the laser diode 9. A monitor current as a detection signal from the photodiode PD is supplied to the laser control circuit 51. The current output from the photodiode PD consists of high- and low-frequency components.

In this case, the laser diode 9, the photodiode PD, and the laser control circuit 51 constitute a laser beam generator.

As shown in FIG. 1, the photodetector 8 is constituted by four photodiodes 8a, 8b, 8c, and 8d.

The cathodes of the photodiodes 8a, 8b, 8c, and 8d of the photodetector 8 are commonly connected to a preamplifier circuit 52 for video signals, with the anodes connected to a focusing/tracking circuit 40.

With this arrangement, currents flow from the cathodes to the anodes in the photodiodes 8a, 8b, 8c, and 8d in accordance with light reflected by the optical disc 1. A video signal processing operation is performed by using a sum current extracted from the cathodes, whereas a focusing operation (keeping the distance between the optical disc 1 and the objective lens 6 constant) and a tracking operation (tracking a guide groove recorded beforehand on the optical disc 1) is performed by using currents respectively extracted from the anodes.

As shown in FIG. 1, the focusing/tracking circuit 40 comprises amplifiers 12a, 12b, 12c, and 12d, a focusing control circuit 15, a tracking control circuit 16, a linear motor control circuit 17, adders 30a, 30b, 30c, and 30d, and operational amplifiers OP1 and OP2.

An output signal from the photodiode 8a of the photodetector 8 is supplied to one terminal of each of the adders 30a and 30c through the amplifier 12a. An output signal from the photodiode 8b is supplied to one terminal of each of the adders 30b and 30d through the amplifier 12b. An output signal from the photodiode 8c is supplied to the other terminal of each of the adders 30b and 30c through the amplifier 12c. An output signal from the photodiode 8d is supplied to the other terminal of each of the adders 30a and 30d through the amplifier 12d.

An output signal from the adder 30a is supplied to the inverting input terminal of the operational amplifier OP1, whereas an output signal from the adder 30b is supplied to the noninverting input terminal of the operational amplifier OP1. A track difference signal corresponding to the difference between the output signals from the adders 30a and 30b is supplied from the operational amplifier OP1 to the tracking control circuit 16. A track driving signal is then formed by the tracking control circuit 16 in accordance with the track difference signal supplied from the operational amplifier OP1.

The track driving signal outputted from the tracking control circuit 16 is supplied to the driving coil 4 for the tracking direction. In addition, the track difference signal used for the tracking control circuit 16 is supplied to the linear motor control circuit 17.

An output signal from the adder 30c is supplied to the inverting input terminal of the operational amplifier OP2, whereas an output signal from the adder 30d is supplied to the noninverting input terminal of the operational amplifier OP2. A signal associated with a focusing point corresponding to the difference between the output signals from the adders 30c and 30d is supplied from the operational amplifier OP2 to the focusing control circuit 15. An output signal from the focusing control circuit 15 is supplied to the focusing driving coil 5, thus causing a laser beam to be just focused on the optical disc 1 all the time.

While the focusing and tracking operations are performed, the sum current based on the outputs from the photodiodes 8a to 8d of the photodetector 8, i.e., the output signals from the adders 30a and 30b, reflects the presence/absence of pits (recorded information) formed on tracks. This signal is converted into a voltage value by the preamplifier circuit 52 for video signals and is supplied to a video signal processing circuit 19. The video signal processing circuit 19 then reproduces image data and address data (a track number, a sector number, and the like).

A laser control circuit 51 causes the laser diode 9 to emit a laser beam corresponding to a reproduction light amount in response to a switching signal from a CPU 23. While the laser beam corresponding to this reproduction light amount is emitted, the laser control circuit 5 causes the laser diode 9 to emit a laser beam corresponding to a recording light amount in accordance with a recording pulse (original signal) supplied from a recording signal forming circuit 34.

The output light amount (reproduction light amount) of the laser diode 9 is controlled by the laser control circuit 51 in accordance with a monitor current outputted from the photodiode PD.

In addition, the recording signal forming circuit 34 as a modulator is arranged at the front stage of the laser control circuit 51. Recording data supplied form an optical disc controller 33 as an external unit through an interface circuit 32 is modulated into a recording pulse by the recording signal forming circuit 34.

The video signal processed by the video signal processing circuit 19 is subjected to a demodulation processing or an error correction processing in the interface circuit 32 and is subsequently outputted to the optical disc controller 33.

The optical disc apparatus further includes a D/A converter 22 for communicating information with the focusing control circuit 15, the tracking control circuit 16, the linear motor control circuit 17k, and the CPU 23.

The tracking control circuit 16 moves the objective lens 6 in accordance with a track jump signal supplied from the CPU 23 through the D/A converter 22 to move a laser beam by a distance corresponding to one track.

The laser control circuit 51, the focusing control circuit 15, the tracking control circuit 16, the linear motor control circuit 17, the motor control circuit 18, the video signal processing circuit 19, the recording signal forming circuit 34, and the like are controlled by CPU 23 through a bus line 20. The CPU 23 is controlled by programs stored in a memory 24.

Figure 2:
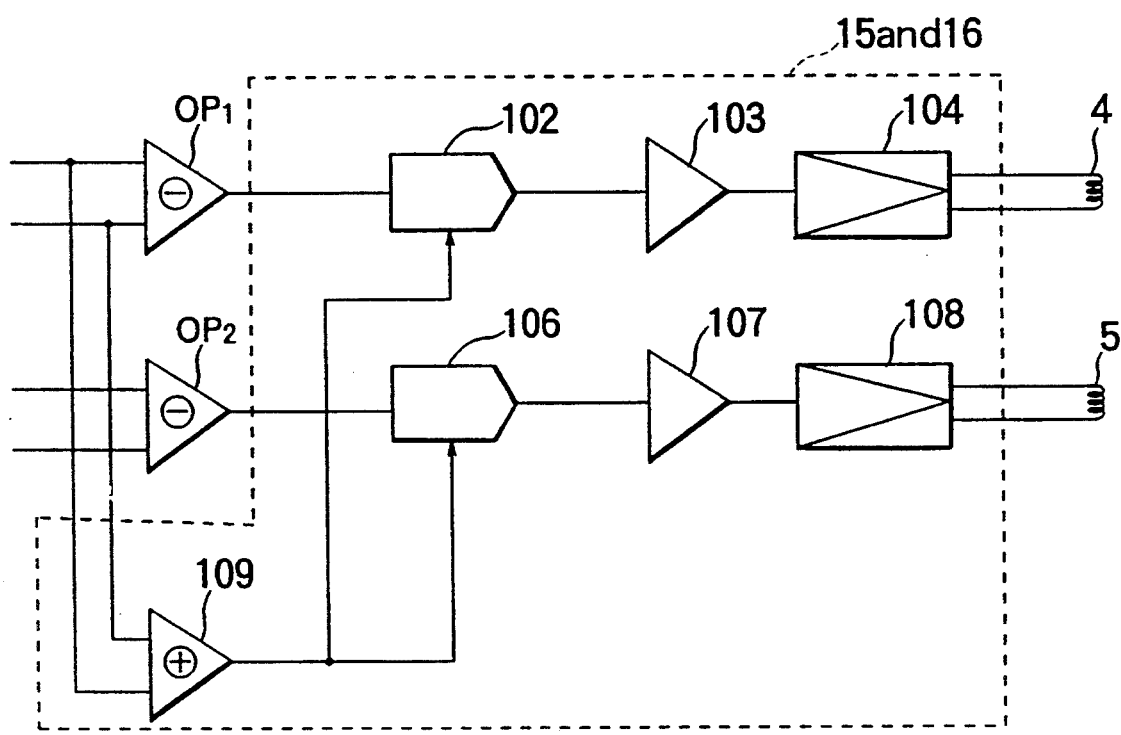
FIG. 2 is a circuit diagram of a focusing control circuit and a tracking control circuit according to an embodiment of the present invention shown in FIG. 1.

As shown in FIG. 2, the focusing control circuit 15 and the tracking control circuit 16 comprise operational amplifiers 101 and 105, multipliers 102 and 106 such as Gilbert-multipliers. A Gilbert-multiplier comprises an automatic gain control circuit of an open loop type, as described with respect to FIGS. 3–5.

FIG. 2 is a circuit diagram of the focusing control circuit 15 and the tracking control circuit 16.

In the figure, reference numerals 102 and 106 are Gilbert-multipliers. Reference numeral 109 is an adder. An output terminal of an operational amplifier OP1 is connected to a first input terminal of the Gilbert-multiplier 102. An output terminal of an operational amplifier OP2 is connected to a first input terminal of the Gilbert-multiplier 106. Two inputs of the operational amplifier OP1 are connected to two input terminals of the adder 109. An output terminal of the adder 109 is connected to a second input terminal of the Gilbert-multiplier 102 and a second input terminal of the Gilbert-multiplier 106. An output terminal of the Gilbert-multiplier 102 is connected to a drive circuit 104 through a phase compensation circuit 103. An output terminal of the Gilbert-multiplier 106 is connected to a drive circuit 108 through a phase compensation circuit 107. The drive circuit 104 is connected to the drive coil 4. The drive circuit 108 is connected to the drive coil 5.

The inputs of the adder 109 are outputs of the adder 30a and 30b. Thus, the output of the adder 109 is equivalent to the amount of reflected light. Therefore, the adder 109 identifies the type of an optical disk for use.

Figure 3:
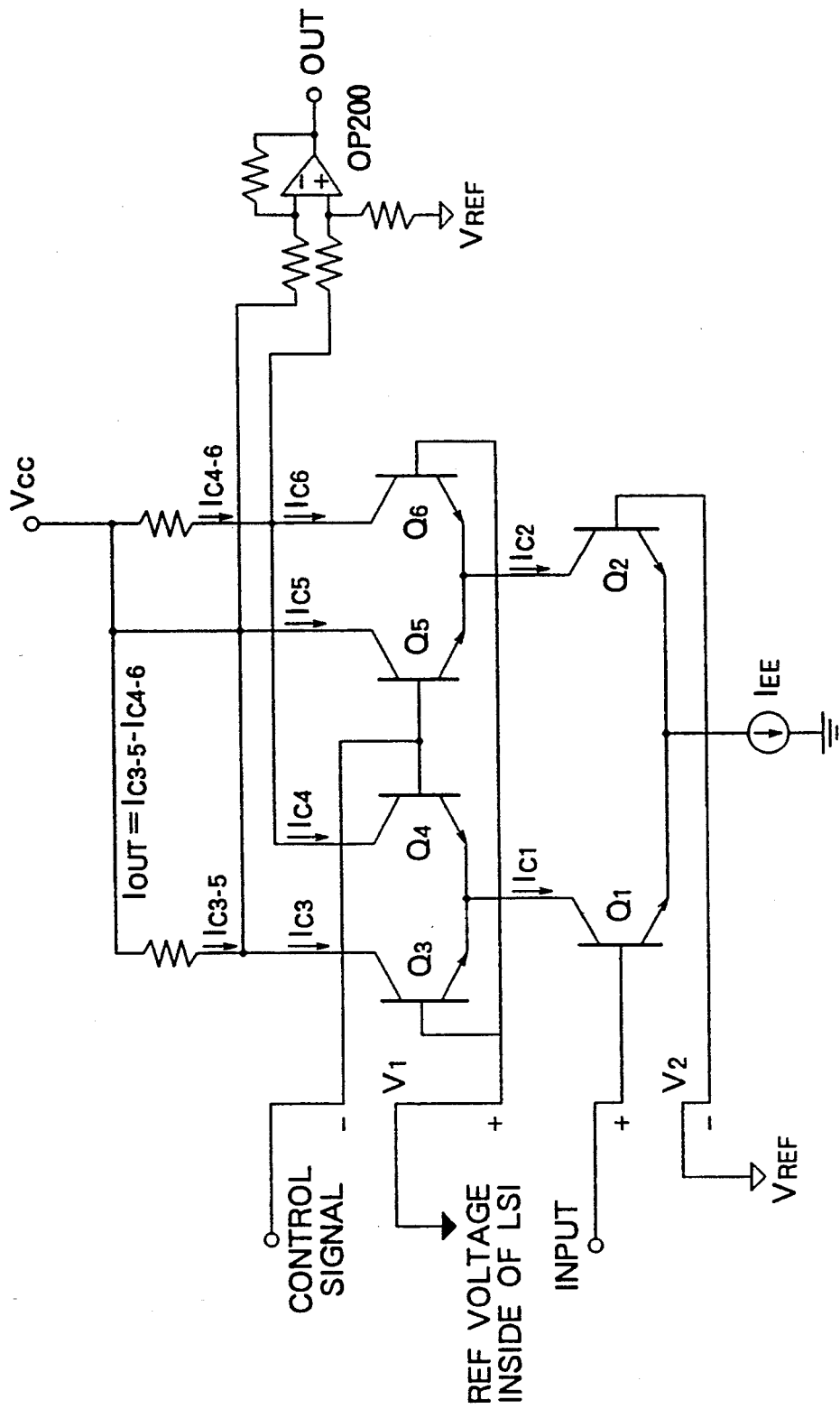
FIG. 3 is a circuit diagram of a Gilbert-multiplier.

The Gilbert-multiplier 102 multiplies the output of the adder 109 by the output of the amplifier OP1. FIG. 3 is a circuit diagram of the Gilbert-multiplier 102.

Figure 4:
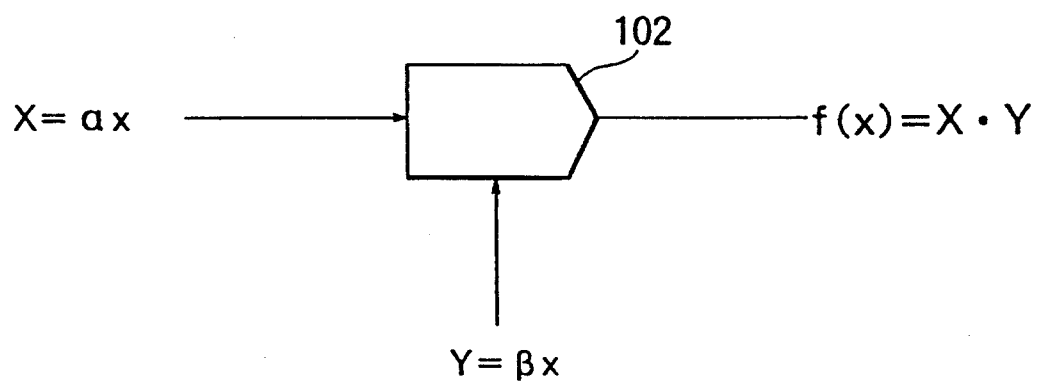
FIG. 4 is a circuit diagram of a multiplier shown in FIG. 2.

As shown in FIG. 4, the output of the Gilbert-multiplier 102 is given by the following formula.

$$f(x) = X \cdot Y = (K - \alpha x)\beta x$$

where f(x) is the output of the Gilbert-multiplier 102; $(K - \alpha x)$ is the output X of the operational amplifier OP1; and $\beta x$ is the output Y of the adder 109.

Figure 5:
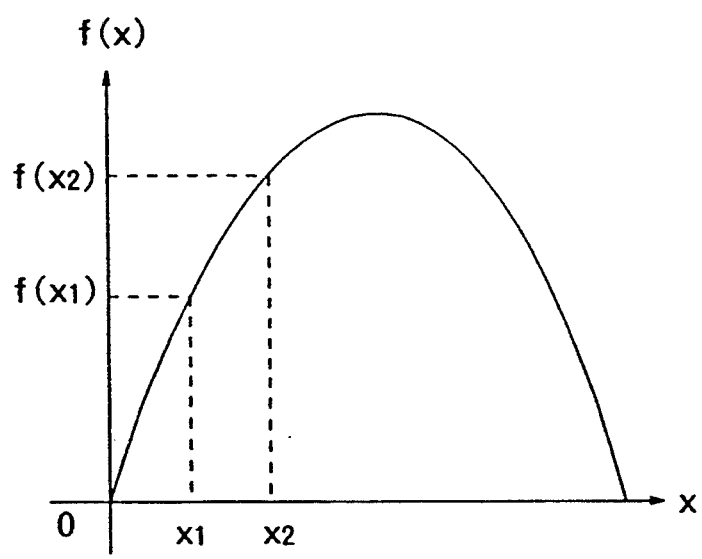
FIG. 5 is a waveform diagram of a signal outputted from the multiplier shown in FIG. 3.

Thus, f(x) is a quadratic function of x as shown in FIG. 5.

In other words, in FIG. 5, when the value of x is in a predetermined range (amplitude: x1 to x2), the value of f(x) is accordingly amplified or attenuated and then outputted (amplitude: f(x1) to f(x2)).

This applies to the Gilbert-multiplier 106.

Thus, as opposed to the conventional apparatus, since the embodiment does not have a feed back circuit with a device susceptible to a temperature change, the offset values of the focusing control circuit 15 and the tracking control circuit 16 less fluctuates with a temperature change in comparison with the conventional circuit. Thus, with the focusing control operation and the tracking control operation according to the embodiment, control errors hardly occur.

It should be noted that the present invention is not limited to the above-mentioned embodiment.

Figure 6:
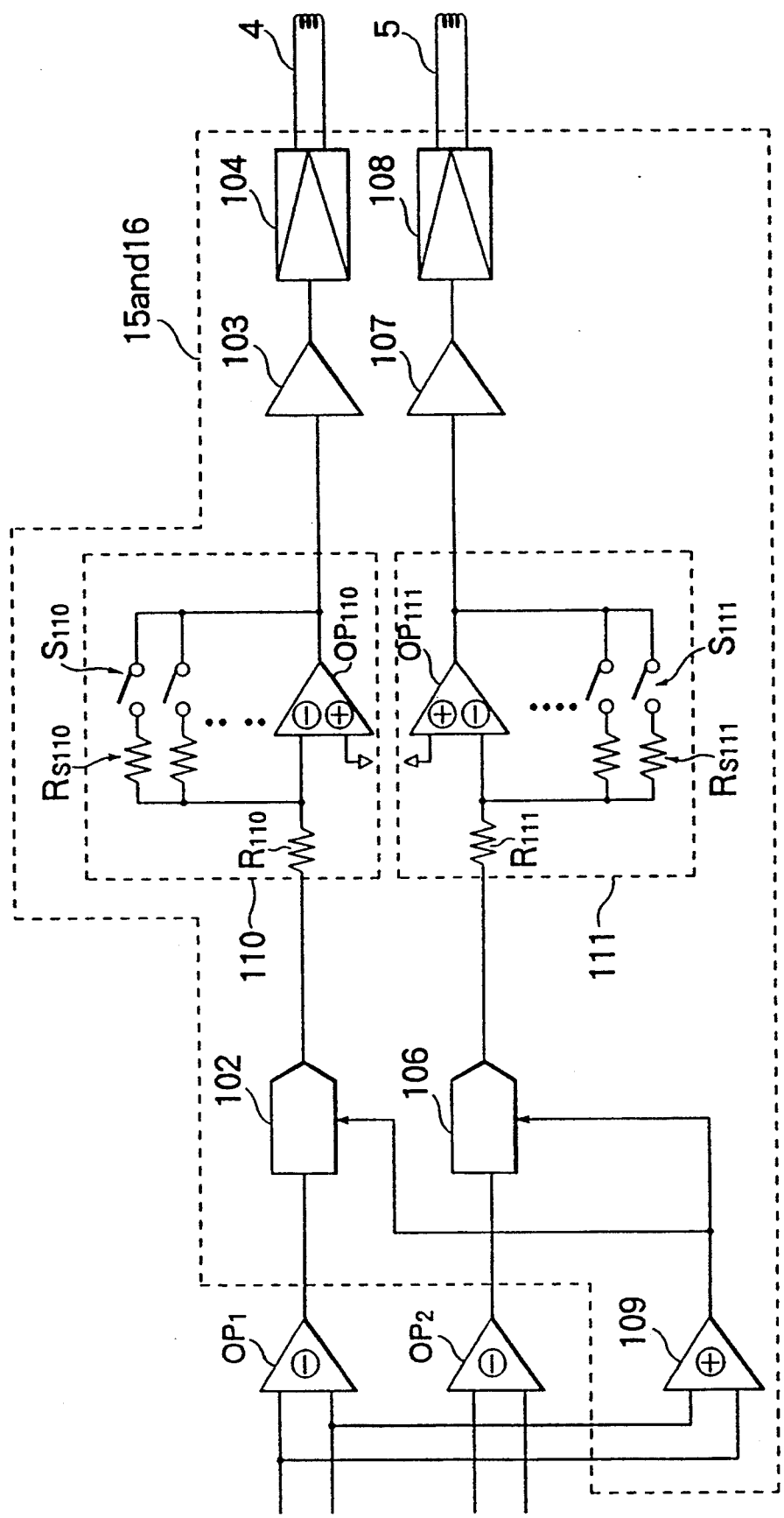
FIG. 6 is a circuit diagram of a focusing control circuit and a tracking control circuit according to another embodiment of the present invention shown in FIG. 1.

For example, as shown in FIG. 6, dividers 110 and 111 can be disposed between the Gilbert-multiplier 102 and the phase compensation circuit 103 and between the Gilbert-multiplier 106 and the phase compensation circuit 103, respectively.

The divider 110 supplies both the output of the Gilbert-multiplier 102 through a resistor R110 and standard voltage to the operational amplifier OP110 and feeds the output of the operational amplifier OP110 back to the input thereof through a switch block S110 and a register block Rs110. In addition, the divider 110 supplies the output of the operational amplifier OP110 to the phase compensation circuit 103. The construction of the divider 111 is the same as that of the divider 110. Each of the register blocks Rs110 and Rs111 may be a single resistor.

The switch blocks S110 and S111 are switched under the control of the CPU 23 corresponding to the type of an optical disc for use. A predetermined amplitude factor is set corresponding to the type of the optical disc.

In this case, the apparatus has a feed back circuit with a device susceptible to a temperature change as the conventional circuit. The conventional circuit dynamically operates, whereas the circuit shown in FIG. 6 statically operates. Thus, the circuit of FIG. 6 less drifts with a temperature change in comparison with the conventional circuit. Therefore, according to the circuit of FIG. 6, the focusing control operation and the tracking control operation hardly result in control errors.

In addition, according to the above-mentioned embodiment, with the adder 109 as a means for detecting reflected light which is different dependently on the type of an optical disc, the construction of the apparatus was simplified. However, for example a dedicated disc type identifying means can be disposed in the vicinity of the optical disc.

Moreover, according to the above-mentioned embodiment, the Gilbert-multipliers 102 and 106, which are almost not susceptible to a temperature change, were used. However, provided that the automatic gain control circuit is of an open loop type, any construction can be used.

In other words, according to the present invention, since the automatic gain control circuit is of an open loop type, an offset drift due to a temperature change less occurs in comparison with the automatic gain control circuit of conventional closed type.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical disc apparatus for radiating light on an optical disc through an objective lens, said apparatus comprising:
   means for moving the objective lens such that the light traces a track of the optical disc;
   first generating means for generating a tracking error signal, the tracking error signal showing a difference between a position of the light radiated on the optical disc and a position of the track of the optical disc corresponding to an amount of light reflected from the optical disc;
   second generating means for generating a sum signal, the sum signal corresponding to an amount of all light reflected from the optical disc;
   amplifying means for amplifying the tracking error signal by multiplying the tracking error signal generated by the first generating means by the sum signal generated by the second generating means to produce a change of level of the tracking error signal, the change corresponding to a change of the amount of all reflected light, the amplifying means having a multiplier yielding a relationship between an input signal of the multiplier and an output signal of the multiplier according to a curved line of a quadratic function, the level of the amplified tracking error signal from the multiplier changing downward when the level of the sum signal as an input signal of the multiplier changes upward; and
   means for activating the moving means in correspondence to the tracking error signal amplified by the amplifying means so that the level of the tracking error signal is reduced.

2. The optical disc apparatus as set forth claim 1, wherein said multiplier includes an automatic again control circuit of an open loop type.

3. The optical disc apparatus as set forth in claim 1, further comprising:
   means for dividing the tracking error signal amplified by said amplification means by a reference value based on a predetermined gain.

4. The optical disc apparatus as set forth in claim 3, wherein said dividing means comprises:
   an operational amplifier for amplifying said tracking error signal;
   a feed back circuit for connecting an input and an output of said operational amplifier through a plurality of resistors and a plurality of switches, said switches being selectively activated to change a synthesized resistance value of said resistors, thereby changing said predetermined gain.

5. The optical disc apparatus as set forth in claim 3, wherein said divider means comprises:
   an operational amplifier for amplifying the tracking error signal amplified by said amplification means; and
   a feed back circuit for connecting an input and an output of said operational amplifier through a resistor.

6. An optical disc apparatus for radiating light on an optical disc through an objective leans, said apparatus comprising:
   means for moving the objective lens to focus the light on the optical disc in a predetermined focus state;
   first generating means for generating a focusing error signal, the focusing error signal showing a difference between a position of the focused light and a position of the predetermined focus state corresponding to an amount of light reflected from the optical disc;
   second generating means for generating a sum signal, the sum signal corresponding to an amount of all light reflected from the optical disc;
   amplifying means for amplifying the focusing error signal by multiplying the focusing error signal generated by the first generating means by the sum signal generated by the second generating means to produce a change of level of the focusing error signal, the change corresponding to a change of the amount of all reflected light, the amplifying means having a multiplier yielding a relationship between an input signal of the multiplier and an output signal of the multiplier according to a curved line of a quadratic function, the level of the amplified focusing error signal from the multiplier changing downward when the level of the sum signal as an input signal of the multiplier changes upward; and means for activating the moving means in correspondence to the focusing error signal amplified by said amplifying means so that the level of the focusing error signal is reduced.

7. The optical disc apparatus as set forth in claim 6, wherein said multiplier includes an automatic gain control circuit of an open loop type.

8. The optical disc apparatus as set forth in claim 6, further comprising:
   means for dividing the focusing error signal amplified by said amplification means by a reference value based on a predetermined gain.

9. The optical disc apparatus as set forth in claim 8, wherein said dividing means comprises:
   an operational amplifier for amplifying said focusing error signal;
   a feed back circuit for connecting an input and an output of said operational amplifier through a plurality of resistors and a plurality of switches, said switches being selectively activated to change a synthesized resistance value of said resistors, thereby changing said predetermined gain.

10. The optical disc apparatus as set forth in claim 8, wherein said divider means comprises:
   an operational amplifier for amplifying the focusing error signal amplified by said amplification means; and
   a feed back circuit for connecting an input and an output of said operational amplifier through a resistor.

* * * * *